Nov. 10, 1942.   P. NAGY ET AL   2,301,743
LIGHT MODULATING DEVICE FOR USE IN TELEVISION RECEIVERS
Filed Feb. 20, 1940   4 Sheets-Sheet 4

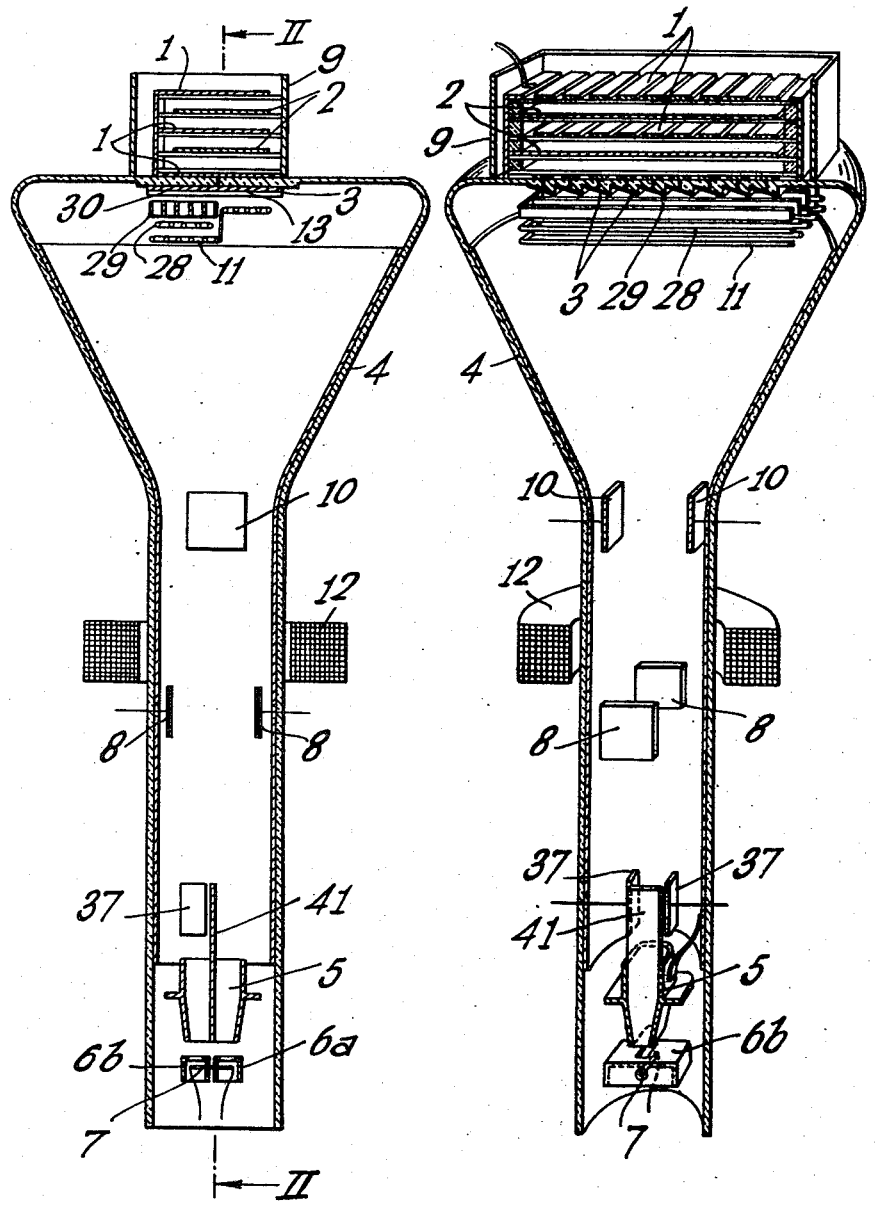

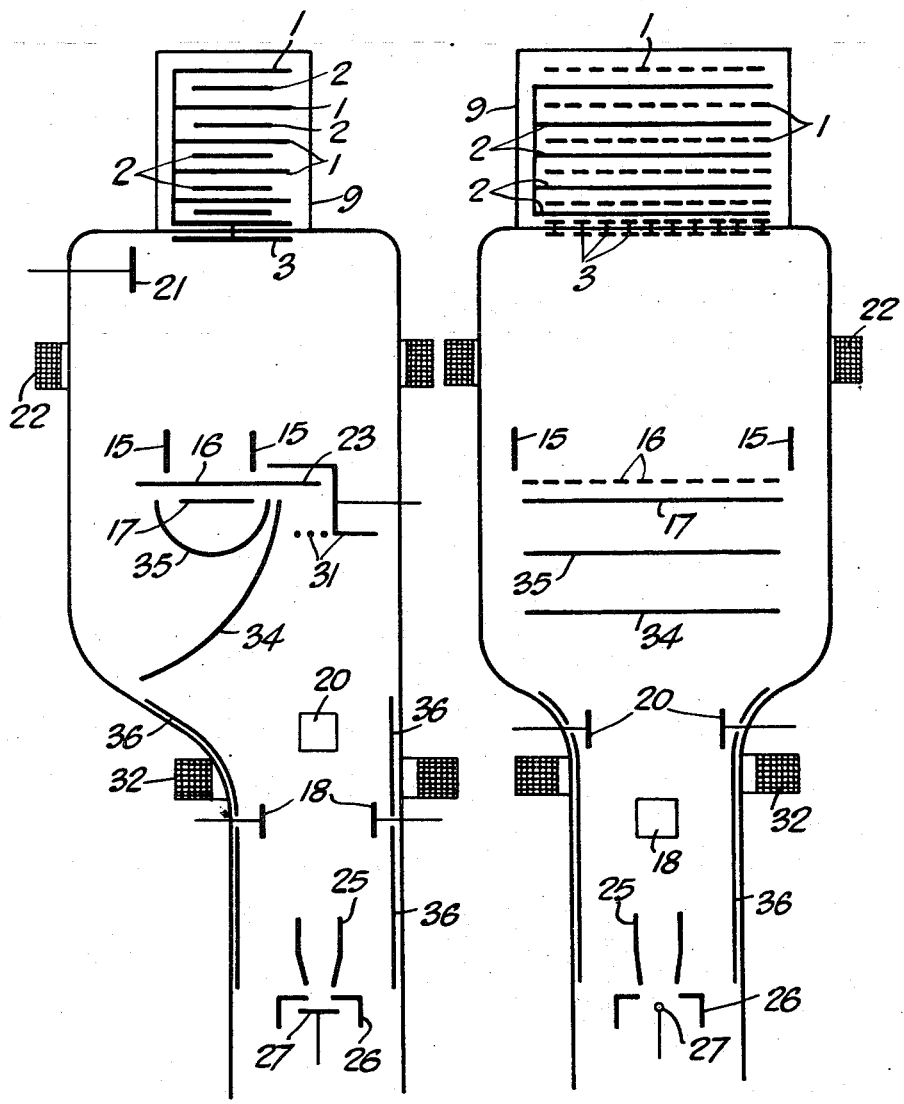

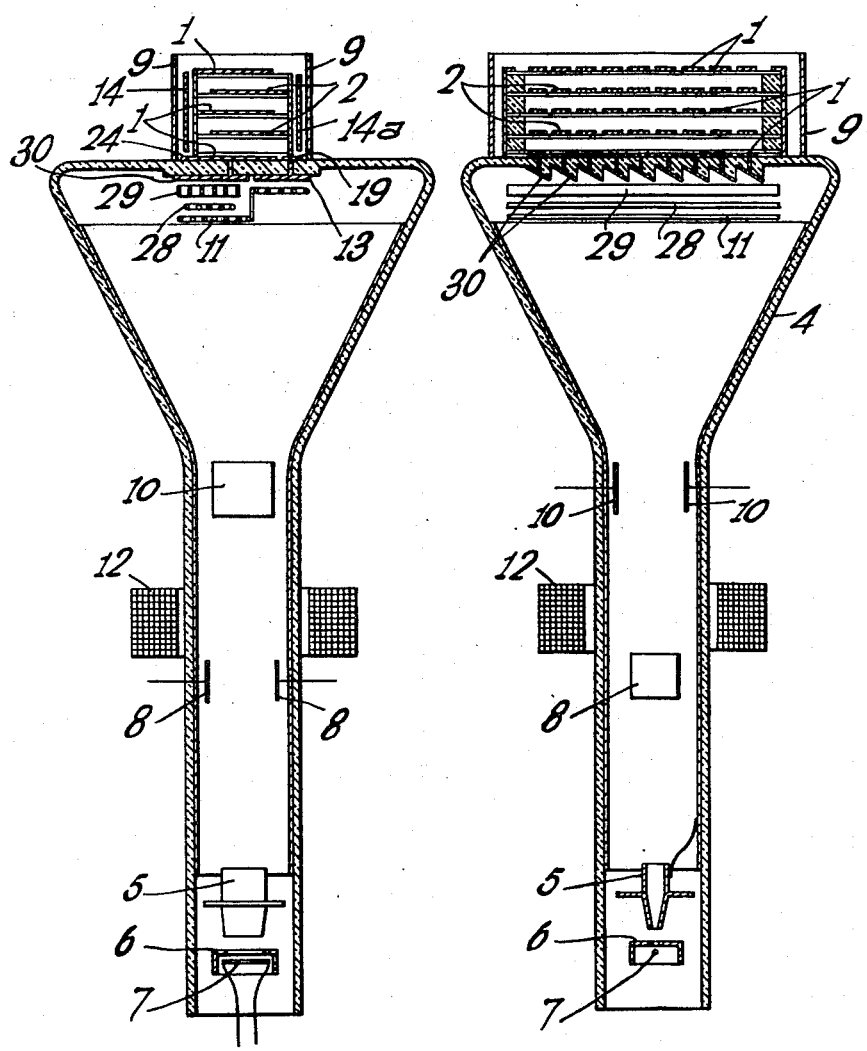

Patented Nov. 10, 1942

2,301,743

UNITED STATES PATENT OFFICE

2,301,743

LIGHT MODULATING DEVICE FOR USE IN TELEVISION RECEIVERS

Paul Nagy, London, and Marcus James Goddard, East Ilsley, Newbury, England

Application February 20, 1940, Serial No. 319,859 In Great Britain February 10, 1939

5 Claims. (Cl. 178—7.5)

This invention relates to light modulating devices for use in television receivers and has reference to devices which comprise a number of light modulating elements, each corresponding to one picture element or less, to which modulating impulses are applied in succession by a cathode ray beam, the light modulating elements being such that they continue to effect modulation of the light in accordance with the impulse applied to them for at least some time after the cathode ray beam has passed on and preferably until the cathode ray beam returns and introduces a different modulation lever. The construction of most of the devices of this kind which have been proposed hitherto would present very great practical difficulties and the object of the present invention is to provide an improved light modulating device of the kind referred to, in which practical difficulties are overcome.

The device of the present invention comprises a number of light modulating elements at least equal to the number of actual picture elements (excluding synchronising signals) in a scanning line. The light modulating elements are of the kind comprising a light transmitting medium in which birefringence is produced by the application of an electric potential. For example they may be Kerr cells in which birefringence is produced directly in nitrobenzene or other suitable liquid medium by the electric stress, or they may comprise a suitable piezo-electric crystal, such as quartz, in which the mechanical stress produced by the deformation of the crystal under the electric stress causes birefringence owing to the photo-elastic properties of the crystal. In the devices particularly described below, the light modulating elements are of the former type, but when the latter type or other types are employed substantially similar arrangements may be adopted.

The device will now be more particularly described with reference to the accompanying drawings.

Figure 1 represents a section through one form of the device in a plane at right angles to the direction of line scanning.

Figure 2 represents a perspective section through that form of the device in the plane of line scanning.

Fig. 3 is a section through an alternative form of device in a plane at right angles to the direction of line scanning;

Fig. 4 is a section through the form of device shown in Fig. 3 in the plane of line scanning;

Fig. 5 represents a section through another alternative form of device according to the invention in the plane at right angles to the direction of line scanning;

Fig. 6 represents a section through this further alternative form of device in the plane of line scanning.

Figure 7:
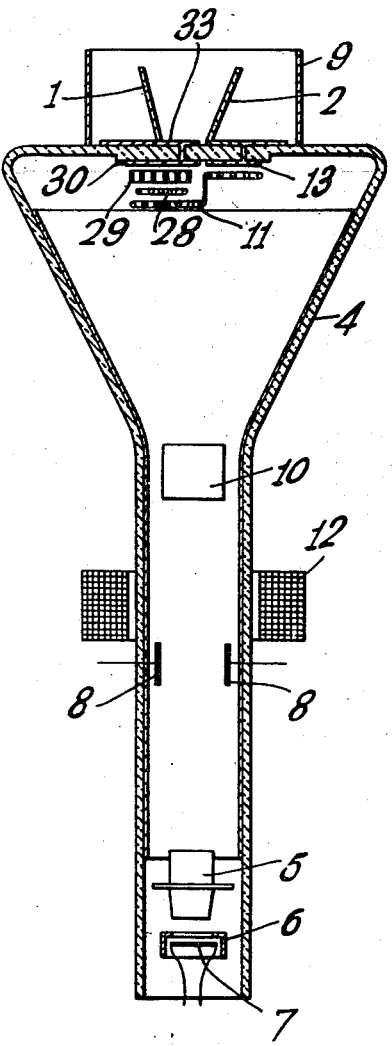
Fig. 7 represents a section through another embodiment of the invention in the plane at right angles to the direction of scanning.

Referring now to Figures 1 and 2, 1 and 2 represent the electrodes of a Kerr cell, which is housed in the container 9, containing nitrobenzene or other liquid showing the Kerr effect. The cell shown is a multiplate cell, alternate electrodes 1 being connected together in one system, and alternate electrodes 2 being connected together in another system. The electrodes 2 all consist of continuous metal strips or metallic layers deposited on supporting laminae of a suitable substance such as mica, and are connected together, conveniently at the ends, as shown in Figure 2. The electrodes 1 are each in the form of a row of mutually insulated narrow metallic strips at right angles to the length of the strips constituting the electrodes 2. They are deposited on or held together by a suitable insulating material. They may conveniently be deposited in the form of layers on mica or glass strips similar to those employed for supporting the electrodes 2, the metallic strips being subsequently formed by ruling lines in the metallic layers. Alternatively the layers may be deposited by cathode sputtering or thermal distillation on supports of mica or the like, a stencil being employed to cast a shadow of the requisite shape on the mica. Further reference to this method will be made when the leakage resistance is discussed later. The strips constituting electrodes 1 are joined together at one end as shown in Figure 1, each strip of one row being connected to the corresponding strips of all the other rows. Each bank of strips so formed, together with the portion of the electrodes 2 opposite to said strips, constitutes one element of the cell, and corresponds to one element of the received television picture.

The light to be modulated by the device is passed through the electrode system in the direction normal to the plane of Figure 2. If the light is transmitted straight through the device, then the members connecting the strips constituting the electrodes 1 must be thin in the plane of Figure 2 to avoid obstructing the light unduly. Thin wires may be employed for said members. The light may, however, be reflected after passing through the device so that it returns once more between the electrodes. In this case also thin wires may be employed as said connecting members, but conveniently the connecting members may be in the form of metallic strips deposited on polished insulating supports, e. g. of glass, said strips serving not only to connect electrically the strips of the electrodes 1 but also to reflect the light. Accurate spacing between the electrodes must be ensured by suitable means, e. g. by employing transparent spacing pieces, e. g. of glass, along one or both edges of the cell parallel to the plane of Figure 2.

The electrodes 2 are maintained at a constant potential. Each element of the electrodes 1 is charged in turn to a potential proportional to the light intensity of the corresponding picture element by a cathode ray beam which makes contact with each of said elements in turn and which is modulated in accordance with the received television picture signals. The electric stress thus established between the electrodes 2 and the various elements of the electrodes 1 modulates polarised light passing between the electrodes and emerging through a suitable analysing system; the ways in which this modulation can be achieved are well known, and need not be described here.

This light modulating cell may be placed inside the cathode ray tube from which modulation is derived, or may be sealed into the wall of the tube, so that the cathode ray beam makes direct contact with one of the electrodes 1. This, however, involves practical difficulties, and preferably the cell is placed outside the tube as shown in the diagrams. Each element of the electrodes 1 is then connected to an element of a contact row 3 inside the tube, the contact row consisting of a row of metallic strips similar to those employed for the electrodes 1. Connection between the contact row 3 and the electrodes 1 may be effected by the capacity between them, or may be made directly with wires sealed into the wall of the tube as shown in the diagrams. The strips forming the contact row 3 need not be of the same length as the strips of the electrodes 1, but may conveniently be longer as shown in Figure 1, so that the area of the cathode ray beam in contact therewith may be increased, thereby increasing the current available in the cathode ray beam for a given current density.

The electron image formed by the cathode ray beam on the part 13 of the contact row 3 is elongated in the direction of the length of each metallic strip of the contact row. The cathode 7 of the cathode ray tube is, therefore, conveniently similarly elongated, and may be in the form of a directly or indirectly heated wire or strip. Electrons are drawn from the cathode by the electrostatic field produced by the anode 5, and the current intensity is controlled by the potential of the grid 6a—6b. An electron image is formed on the contact row by an electrostatic or an electromagnetic focusing system. In the diagrams, an electromagnetic focusing coil is shown at 12. In this case the electron image does not necessarily lie parallel to the cathode owing to the rotation produced by the electromagnetic focusing coil, but it is shown as if it were parallel to the cathode in the diagrams for convenience of representation. Exact focusing in the direction of the length of the electron image is immaterial.

The received television picture signals may be applied to the grid 6a—6b, thereby modulating the current intensity of the cathode ray beam. Alternatively they may be applied to the electrostatic deflection plates 8 provided for the purpose, thereby controlling the area of the electron image in contact with the contact row 3. The latter method may be advantageous if varying the potential of the grid too greatly influences the focus of the electron image, but it somewhat increases the power consumption of the tube.

A saw-tooth oscillation is applied to the electrostatic deflection plates 10, said oscillation being synchronized with the line synchronizing pulses of the received picture signals, thereby causing the electron image to scan the contact row 3 once every picture line period. Electromagnetic deflection coils may be employed in place of the electrostatic deflection plates 10.

In this form of this device shown in Figs. 3 and 4, a cathode ray beam is produced by the cathode 27 and the associated grid 26 and first anode 25, and is focused by means of the electromagnetic focusing coil 32, or by a corresponding electrostatic focusing system, onto the contact row 23. The cathode ray beam is caused to scan this contact row by means of signals applied to the electrostatic deflection plates 20, or to corresponding electromagnetic deflection coils. The received picture signals are applied either to the grid 26 or to the electrostatic deflection plates 18. The elements of the contact row 23 are charged positively by secondary emission, the secondary electrons being collected by an auxiliary electrode shown diagrammatically at 31.

The contact row 23 is not, however, directly connected to the elements of the Kerr cell, but instead is connected to elements of a grid 16 which controls the current emitted from a cathode 17 due to the electrostatic field produced by an anode 15. The elements of the grid 16 are mutually insulated, and the current passing through each element from the cathode 17 is proportional to the charge received by the corresponding element of the contact row 23 from the cathode ray beam. An electron image of the apertures of the grid 16 is formed on the contact row 3 by means of the electromagnetic focusing coil 22, the image of any one aperture being formed on the corresponding element of the contact row 3. The current reaching that element of the contact row 3 is thus proportional to the current intensity of the cathode ray beam scanning the corresponding element of the contact row 23.

Each element of the contact row 23 is connected through a leakage resistance to a member kept at such a potential that, when the elements of the contact row acquire that potential, current is just prevented from passing through the apertures of the grid 16. The leakage resistance is so chosen that the elements of the contact row 23 discharge in a time greater than the time of scanning of one element but not greater than the time of scanning of one line. Until the elements of the contact row 23 have discharged, current continues to flow through the grid 16 to the contact row 3. As this discharge takes longer than the time of scanning of one element, the charge reaching the contact row 3 is greater than it would be if charged by a cathode ray beam scanning the elements of the contact row 3. The leakage resistances of the elements of the contact row 23 are so chosen that the charge acquired by the contact row 3 is just sufficient to modulate the amount of light required in the Kerr cell. The elements of the contact row 3 may be charged directly by the electrons reaching them from the cathode 17, but are preferably charged by secondary emission, the secondary electrons being collected by an auxiliary electrode 21.

The cathode 17 may be heated directly or indirectly, but is conveniently made in the form of a flat plate of considerable surface area, indirectly heated.

Suitable screens, such as those shown at 34 and 35, are necessary to screen the system associated with the cathode 17 from the system associated with the cathode 27. Other electrodes, such as that shown at 36, are necessary to keep the interior of the cathode ray tube at a uniform electrostatic potential and for other like purposes. Such electrodes are necessary with all forms of the invention, but they have been omitted from the description for the sake of clarity, as their function is well known in the technique associated with cathode ray tubes and other thermionic devices.

The cell elements are thus charged once every picture line to a potential corresponding to the light intensity of the picture elements, and therefore modulate the light passing through them in proportion to the corresponding received television picture signals. This charging could be effected directly by the cathode ray beam, the charge acquired by the elements being negative, and proportional to the current intensity of the cathode ray beam. This method is, however, inefficient, as some secondary electrons are unavoidably emitted by the metallic strips with which the cathode ray beam makes contact, and this emission of electrons partly neutralises the charge acquired by the strips from the cathode ray beam, so that the effective charging current is less than the beam current. Also the secondary electrons emitted from one strip tend to pass to neighbouring strips if said neighbouring strips happen to be at a more positive potential than the strip with which the cathode ray beam is making contact, thereby producing a spread of the effective area of contact of the cathode ray beam, with consequent loss of definition of the picture produced with the aid of the light modulating device. It is more advantageous to utilise the secondary emission to effect the charging of the elements. If this method is adopted, the metallic strips with which the cathode ray beam makes contact are composed of or coated with a substance of high secondary electron emissivity. The number of electrons lost by the strips is then several times greater than the number reaching them from the cathode ray beam. The elements then receive a positive charge proportional to the current intensity of the cathode ray beam, and the effective charging current is several times greater than the beam current. According to the invention there is provided an auxiliary electrode, kept at a potential more positive than any of the metallic strips with which the cathode ray beam makes contact, near the metallic strips to collect the secondary electrons. This procedure prevents electrons from passing from one strip to neighbouring strips and producing loss of definition in the reproduced picture.

The total number of elements in the device corresponds to one picture line. An optical image of the device in the direction of scanning is formed on the viewing screen of the television receiver. An optical image, not necessarily of the device, of height equal to the breadth of one picture line, is formed on the screen in the direction at right angles to line scanning. Scanning motion in that plane is provided by a mechanical frame scanner, such as a mirror drum or an oscillating mirror. Thus at any one time the number of illuminated picture elements appearing on the screen corresponds to one picture line.

It is necessary that the modulation level in any one element of the device should become zero after one scan by the time the cathode ray beam returns to modulate the element again in the next scan. One method whereby this might be achieved would be to connect each bank of strips constituting an element of the electrodes 1 (Figure 2) through a leakage resistance to a member common to all the elements, the potential of this common member being the potential which the elements of the electrodes 1 possess when unmodulated. The actual value of this potential relative to the potential at which the electrodes 2 are maintained is the bias voltage required by the Kerr cell elements with the particular mode of operation with which th Kerr cell is employed. There are various possible modes of operation (positive or negative modulation, half-wave bias, etc.), but these are well known in Kerr cell technique, and need not be described in detail here. The value of the leakage resistance would be such that the charge on the electrodes 1 is reduced substantially to zero in the time of scanning of one picture line, i. e., the capacity elements constituted by the elements of electrodes 1 and the continuous electrodes 2 have a time constant such that the capacities substantially discharge in the period of scanning of one picture line.

This method, however, has the disadvantage that the average modulation level of any element in the cell during its active time is only half the modulation level actually produced by the cathode ray beam, and furthermore it is difficult to attain in practice, the precise value of the leakage resistance required. The invention, therefore, provides an improved method of reducing the modulation level to zero after each scan. In this method, the contact row 3 is divided into two mutually connected sections 13 and 30 by the electrode system 11, 28, 29, which lies adjacent to the contact row 3. The electrodes 11, 28 and 29 are each constructed in the form of a grid whose members run parallel to the direction of scanning, i. e. at right angles to the direction in which the electron image produced by the cathode ray beam requires definition, so that the electrostatic fields produced by the members of said electrodes do not defocus the electron image in the direction of scanning. The section 13 of the contact row 3 performs the function already described, namely it is charged by secondary emission when scanned by the cathode ray beam, the secondary electrons being collected by the electrode 11. The charge thus given to the contact row 3, and thus to each element of the electrodes 1, is not, however, allowed to leak away, but remains substantially unchanged until the cathode ray beam has very nearly returned in the next scan to give a fresh charge to the element in question. The charge is then removed by an auxiliary cathode ray beam which scans the section 30 of the contact row 3 a little in advance of the main cathode ray beam. Electrons are prevented from leaving the section 30 of the contact row by the electrostatic field produced by the electrodes 28 and 29. The electrode 29 is composed of or is coated with a substance of high secondary electron emissivity, and is constructed of such a form that a substantial part of the auxiliary cathode ray beam falls thereon. This causes secondary emission which in effect multiplies the current intensity of the auxiliary cathode ray beam several times, and the electrons are forced by the electrostatic field produced by the electrode 28, which is kept at a more negative potential than the electrode 29, to pass to the section 30 of the contact row 3 until the potential of the elements of the contact row becomes sufficiently negative to return the electrons to the electrode 29. The potentials of the electrodes 28 and 29 are so chosen that the potential of the elements of the contact row 3 at which electrons are returned to the electrode 29 is the potential which the elements of the electrodes 1 of the Kerr cell require to reach in order to give the correct bias to the Kerr cell. The electrode 11 covers not only section 13 of the contact row 3, but also section 30, with the associated electrodes 28 and 29, as shown in Figure 1, thereby screening the remainder of the cathode ray tube from the electrostatic fields produced by the electrodes 28 and 29 and the contact row 3.

The auxiliary cathode ray beam may be produced by an auxiliary cathode in the cathode ray tube, with any necessary auxiliary electrodes, e. g. grid and first anode. Conveniently, however, some of the components associated with the auxiliary cathode ray beam and the main cathode ray beam are common, e. g. the focusing coil 22 and the deflection plates 20 (Figure 2). Alternatively the auxiliary cathode ray beam may, in fact, be a part of the main beam, the elements of the contact row 3 being inclined and/or curved in such a way that the portion of the cathode ray beam which falls on the section 30 of the contact row makes contact with a given element of the contact row before the portion of the cathode ray beam which falls on the section 13 of the contact row makes contact with that element.

A preferred arrangement is shown in Figure 1. The cathode 7 produces both the main and the auxiliary ray beam. The auxiliary cathode ray beam passes through a grid 6b, the potential of which is adjusted to regulate the current intensity of the auxiliary cathode ray beam to a convenient level. The anode 5 is common to both beams and the necessary deflection of the auxiliary beam with respect to the main beam is produced by reflection plates 37. The main beam is screened from the influence of these plates 37, by the dividing plate 41 fixed in the centre of the anode 5.

In order to secure the maximum efficiency of light modulation by the Kerr cell, the difference of potential between the electrodes 1 and the electrodes 2 of the Kerr cell for full modulation is so chosen that the liquid employed in the Kerr cell is stressed to the maximum potential gradient which it will withstand without breaking down. A potential difference of this same order can exist between adjacent elements of the electrodes 1 and the contact row 3, if such adjacent elements happen to be stressed one to full modulation and the other to zero modulation. The separation between such adjacent elements must be such that a discharge does not take place between them. In practice the separation between adjacent elements of the electrodes 1 will usually be of the same order as the width of the elements themselves. This does not mean that the light passing opposite the separations will be unmodulated because, since the electrodes 2 are continuous, electrostatic fields will be set up in the spaces between the elements of electrodes 1 as well as opposite said elements. It is not desirable that there should be corresponding gaps between the elements of the contact row 3, because this would mean that the cathode ray beam (or beams) would not continuously make contact with the elements of the contact row, part of the energy of the beam or beams thus being wasted. It is therefore advantageous to construct the elements of the contact row in saw-tooth form, as shown in Figure 2.

In order to reduce the potential difference between adjacent elements of the electrodes 1, and so reduce the necessary separation between them, it is possible to increase the number of electrode plates in the Kerr cell, and to employ a correspondingly lower level of modulation, each gap of the cell being thus never fully modulated. In this way the same amount of light can be modulated with the same cathode ray beam current, but with a lower maximum potential difference in the cell. The method has the disadvantage that, owing to a residual amount of light which is transmitted by a Kerr cell, even when unmodulated, due to scattering of light from the electrodes and the liquid, etc., the residual light transmitted by the cell when unmodulated is increased in proportion to the increase in the number of electrode plates without a corresponding increase in the total light modulated, thereby reducing the maximum available contrast ratio in the picture reproduced by the device.

A method by which the potential difference between adjacent members of the electrodes 1 may be reduced to half its usual value is shown in Figures 5 and 6. In this method the electrodes 2 are divided into elements corresponding to the elements of the electrodes 1. This is shown in Figure 6, which shows a modified form of the Kerr cell and contact row shown in Figure 2. The elements of the electrodes 2 are connected at the ends in the same way as the elements of the electrodes 1. This is shown in Figure 5 which shows the same Kerr cell as Figure 6, but viewed from the same direction as the Kerr cell shown in Figure 1. In Figure 5 the electrodes 2 are shown connected at one end and the electrodes 1 at the other end, but alternatively both sets may be connected at the same end. Connection may be made by thin wires, or by strips of reflecting material, as already described with reference to Figure 1. The contact row which is shown at 3 in Figures 1 and 2 is divided into two sections 13 and 30 which are mutually insulated, and electrodes 28, 29 and 11 are associated with these two sections. The action of these electrodes is essentially the same as that of the electrodes similarly numbered in Figure 1, with the exception of two facts to which attention must be directed, viz. firstly, the two sections 13 and 30 of the contact row in Figure 1 are electrically connected but in Figure 5 are mutually insulated, and secondly, the sections 30 and 13 of the contact row in Figure 1 are actuated in succession by the same or different cathode ray beams, but in Figure 5 are actuated simultaneously by the same cathode ray beam produced by the cathode 7, the single grid 6, and the anode 5. The elements of the electrodes 1 are connected to the corresponding elements of the section 30 of the contact row, and the elements of the electrodes 2 to the corresponding elements of the section 13 of the contact row, as shown in Figure 5. The elements of the electrodes 2 may be connected to an auxiliary contact row 19 on the outside of the cathode ray tube, which is in turn connected to the contact row 13 on the inside of the tube; the use of the auxiliary contact row 19 is a matter of convenience, and is not essential.

The elements of the electrodes 1 are connected through leakage resistances to a member which is maintained at some constant potential, and the elements of the electrodes 2 are connected through leakage resistances to a member which is also maintained at some constant, but not necessarily the same, potential. The difference of potential between the members to which the elements of the respective electrodes are connected gives the bias potential of the elements of the Kerr cell. When the cathode ray beam makes contact with an element of the contact row, the section 13 is charged to a more positive potential and the section 30 is simultaneously charged to a more negative potential, as already described with reference to Figure 1. This charging increases the potential difference between the corresponding elements of the electrodes 1 and 2, and so modulates the corresponding element of the Kerr cell, the level of modulation being proportional to the current intensity of the cathode ray beam. Full modulation is achieved when the current intensity of the cathode ray beam is sufficient to charge the elements of section 30 to the negative limiting potential already described with reference to Figure 1, and to charge the elements of the section 13 to its positive limiting potential, which is reached when said potential is sufficiently positive to collect a proportion of the secondary electrons emitted, so that the number passing from the elements of section 13 to the electrode 11 is equal to the number of primary electrons reaching said elements.

When this method of modulation is adopted, the elements of electrodes 1 are charged negatively and the elements of electrodes 2 positively. The difference of potential between an element which is fully modulated and an adjacent unmodulated element is thus only half what it would be if one set of the electrodes were kept at a constant potential as in the methods of modulation previously described.

The leakage resistances may consist of metallic members connected to the elements of the electrodes 1 and 2. When the electrodes 1 and 2 of the Kerr cell are deposited by thermal distillation as suggested above, or are manufactured by any process involving the slow deposition of the metallic layers, the manufacture of the leakage resistances may conveniently be effected by, and as part of, the same process. The said leakage resistances may then consist of tongues of metal extending from the ends of the metallic strips constituting the electrodes 1, said tongues of metal being thinner, and hence of higher resistance, than the strips constituting the electrodes, the difference in thickness being achieved by exposing the tongues of metal to the deposition process for a shorter time than that allowed for the strips constituting the electrodes. Alternatively, the leakage resistance may be provided by the transparent medium, usually nitrobenzene in the Kerr cell. This liquid inevitably causes some leakage, but usually such leakage is less than that necessary to discharge the electrodes in the required time. Such leakage can, however, be increased by mixing suitable substances in small proportions with the liquid of the Kerr cell. This method presents the difficulty that, if no additional electrodes are included in the device, the potential to which the electrodes 1 discharge is the same as the potential of the electrodes 2, since the leakage resistance connects the electrodes 1 to the electrodes 2. The result is that the bias of the Kerr cell is zero, and this is almost invariably not the bias required. To overcome this difficulty, additional electrodes 14 and 14a are provided which are respectively nearer to the electrode system 1 and to the electrode system 2. They are maintained at different potentials and, together with the electrodes 1 and 2 and the liquid of the Kerr cell, constitute a potentiometer. The electrodes 1 and 2 lie at intermediate points of the potentiometer, and the form, size, disposition and potential of the electrodes 14—14a, are so chosen that the equilibrium potentials of the electrodes 1 and 2 provide the correct bias for the Kerr cell. One or more of the plates of electrodes 1 and 2 may be suitably extended, as shown at 24, to facilitate the construction of the potentiometer.

The overall size of the Kerr cell, and therefore the size of the cathode ray tube required, can be reduced somewhat without correspondingly reducing the size or separation of the elements of the cell, by employing a cell curved in the direction of scanning. If the cell is curved so that the concave side is towards the image projected on the screen, the curvature may be utilized to compensate for the curvature of the field produced by a simple projection lens system, thereby rendering possible the use of a less highly corrected, and therefore less expensive, lens system.

The device has been described with reference to a multiplate Kerr cell system. When only a few plates of electrodes would be necessary to modulate the light required, it may be advantageous to use instead a Kerr cell system with a single pair of electrodes shaped to the shape of the light beam. In this case the electrodes can conveniently take the form shown in Figure 7 in which the Kerr cell is similar in principle to that shown in Figure 5, but employs a single pair of electrodes both of which are divided into elements like that shown in Figures 5 and 6. This cell is adapted to the use of a reflector to reflect the light which has passed through the cell so that it passes back through the cell once more. The reflector is situated on the wall of the cathode ray tube at 33, and may be an independent unit or part of the contacts connected to the elements of the electrodes 1 or 2 or both. This type of cell can be employed equally well if only one of the electrodes is divided into elements as in Figs. 1 and 2.

The amount of light modulated by the device when a multiplate Kerr cell is employed can be increased by increasing the number of plates employed in the Kerr cell. Such an increase, however, requires a correspondingly increased charge to modulate the device, which in turn means a greater beam current in the cathode ray beam. The primary limitation on the amount of light which can be modulated by the device is usually set by the maximum current intensity which can be supplied in the cathode ray beam with the requisite definition in the electron image. An alternative form of the device whereby this limitation is overcome is shown in Figures 3 and 4. In this form of the device, a cathode ray beam is produced by the cathode 27 and the associated grid 26 and first anode 25, and is focused by means of the electromagnetic focusing coil 32, or by a corresponding electrostatic focusing system, onto the contact row 23. The cathode ray beam is caused to scan this contact row by means of signals applied to the electrostatic deflection plates 20, or to corresponding electromagnetic deflection coils. The received picture signals are applied either to the grid 26 or to the electrostatic deflection plate 18. The elements of the contact row 23 are charged positively by secondary emission, the secondary electrons being collected by an auxiliary electrode shown diagrammatically at 31, it being understood that this auxiliary electrode system would in order to fulfill the requirements of the present invention be arranged, for example, in the manner of the electrode system 11, 28, 29 of Figures 1 and 2.

Thus far the charging of the contact row 23 is identical with the charging of the contact row 3 of Figures 1 and 2. The contact row 23 is not, however, directly connected to the elements of the Kerr cell, but instead is connected to elements of a grid 16 which controls the current emitted from a cathode 17 due to the electrostatic field produced by an anode 15. The elements of th grid 16 are mutually insulated, and the current passing through each element from the cathode 17 is proportional to the charge received by the corresponding element of the contact row 23 from the cathode ray beam. An electron image of the apertures of the grid 16 is formed on the contact row 3 by means of the electromagnetic focusing coil 22, the image of any one aperture being formed on the corresponding element of the contact row 3. The current reaching that element of the contact row 3 is thus proportional to the current intensity of the cathode ray beam scanning the corresponding element of the contact row 23.

Each element of the contact row 23 is connected through a leakage resistance to a member kept at such a potential that, when the elements of the contact row acquire that potential, current is just prevented from passing through the apertures of the grid 16. The leakage resistance is so chosen that the elements of the contact row 23 discharge in a time greater than the time of scanning of one element but not greater than the time of scanning one line. Until the elements of the contact row 23 have discharged, current continues to flow through the grid 16 to the contact row 3. As this discharge takes longer than the time of scanning of one element, the charge reaching the contact row 3 is greater than it would be if charged by a cathode ray beam scanning the elements of the contact row 3. The leakage resistances of the elements of the contact row 23 are so chosen that the charge acquired by the contact row 3 is just sufficient to modulate the amount of light required in the Kerr cell. This Kerr cell is of the same form as that described with reference to Figures 1 and 2. The elements of the contact row 3 may be charged directly by the electrons reaching them from the cathode 17, but are preferably charged by secondary emission, the secondary electrons being collected by an auxiliary electrode 21.

The cathode 17 may be heated directly or indirectly, but is conveniently made in the form of a flat plate of considerable surface area, indirectly heated.

Suitable screens, such as those shown at 34 and 35, are necessary to screen the system associated with the cathode 17 from the system associated with the cathode 27. Other electrodes, such as that shown at 36, are necessary to keep the interior of the cathode ray tube at a uniform electrostatic potential and for other like purposes. Such electrodes are necessary with all forms of the invention, but they have been omitted from the description for the sake of clarity, as their function is well known in the technique associated with cathode ray tubes and other thermionic devices.

What we claim and desire to secure by Letters Patent is:

1. A television light modulating device for use with means for producing cathode rays modulated by television signals comprising a light cell of the kind wherein birefringence is produced by establishing an electric potential difference between electrodes of an electrode system thereof, a contact member subject to the action of said rays and having two parts, an auxiliary electrode means arranged adjacent one of said parts and in the path of such cathode rays whereby said part is charged negatively by the action of such rays, an auxiliary electrode means arranged adjacent the other part of said contact member and in the path of such cathode rays whereby said other part is charged positively by the action of such rays, and means serving electrically to connect said two parts of the contact member with the electrode system of the light cell whereby the electric charges imparted to said parts according to the modulation of the cathode rays will establish corresponding electric potential differences between the electrodes of said light cell.

2. A television light modulating device for use with means for producing cathode ray beams modulated by television signals comprising a light cell of the kind wherein birefringence is produced by establishing an electric potential difference between electrodes of an electrode system thereof, contact means subject to the action of said beam and having two separate parts, an auxiliary electrode means arranged adjacent one of said parts and in the path of a portion of said cathode ray beam so that said part is charged negatively by the action of said portion of the beam, an auxiliary electrode means arranged adjacent the other part of said contact means and in the path of another portion of the said beam whereby said other part is charged positively by the action of said other portion of the beam, and means serving electrically to connect said two parts of the contact means with the electrode system of the light cell whereby the relative potentials imparted to said parts according to the modulation of the cathode ray beam will establish corresponding electric potential differences between the electrodes of said light cell.

3. A television light modulating device for use with means for producing cathode rays modulated by television signals comprising a light cell of the kind wherein birefringence is produced by establishing an electric potential difference between electrodes of an electrode system thereof which includes a plurality of parallel electrodes constituting two parallel sets of electrodes, contact means subject to the action of such rays and having two parts, an auxiliary electrode means arranged adjacent one of said parts and in the path of such cathode rays whereby said part is charged negatively by the action of such rays, an auxiliary electrode system arranged adjacent the other part of said contact means and in the path of such cathode rays whereby said other part is charged positively by the action of such rays, and means serving electrically to connect said contact means to each of the said sets of electrodes so that the electric charges imparted to the said parts of the contact means according to the modulation of the cathode rays will establish corresponding electric potential differences between the parallel electrodes of each set thereof.

4. A television light modulating device for use with means for producing cathode rays modulated by television signals comprising a light cell of the kind wherein birefringence is produced by establishing an electric potential difference between electrodes of an electrode system thereof which includes a plurality of parallel electrodes constituting two parallel sets of electrodes, one electrode of each set being divided into elements, each element of one such divided electrode being electrically connected to the corresponding element of the other divided electrode but insulated from all the other elements, each group of elements so connected corresponding to one picture element in the television picture, a row of contact means subject to the action of said rays and having two parts, an auxiliary electrode means arranged adjacent one of said parts and in the path of such cathode rays whereby said part is charged negatively by the action of such rays, an auxiliary electrode system arranged adjacent the other part of said contact means and in the path of such cathode rays whereby said other part is charged positively by the action of such rays, means serving electrically to connect each contact means of the row with a separate group of the connected elements, and means whereby the cathode rays are applied in succession to the row of contact means at picture line frequency to thereby establish electric potential differences between the electrodes of each successive set of electrodes of the light cell.

5. A television light modulating device for use with means for producing two separate cathode ray beams one of which is modulated by television signals comprising a light cell of the kind wherein birefringence is produced by establishing an electric potential difference between electrodes of an electrode system thereof, a contact member subject to the action of said beams and having two directly connected parts, an auxiliary electrode means arranged adjacent one of said parts and in the path of one of said cathode ray beams whereby said contact member is charged positively by the action of said beam, an auxiliary electrode means arranged adjacent the other part of said contact member and in the path of the other cathode ray beam whereby said member is charged negatively thereby to neutralise the positive charge on the said contact member by the action of said other cathode ray beam, and means serving electrically to connect said two parts of the contact member with an electrode of the light cell whereby the electric charges imparted to said member according to the modulation of the said cathode ray beam will establish corresponding electric potential differences between the electrodes of the electrode system of said light cell.

PAUL NAGY.
MARCUS JAMES GODDARD.